(12) United States Patent
Tahara et al.

(10) Patent No.: US 8,493,989 B2
(45) Date of Patent: Jul. 23, 2013

(54) NETWORK DEVICE AND DATA CONTROL PROGRAM

(75) Inventors: Tetsuya Tahara, Fukuoka (JP); Kazuyuki Inomoto, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 902 days.

(21) Appl. No.: 11/832,724

(22) Filed: Aug. 2, 2007

(65) Prior Publication Data

US 2008/0031247 A1 Feb. 7, 2008

(30) Foreign Application Priority Data

Aug. 4, 2006 (JP) ................................. 2006-213899

(51) Int. Cl.
*H04L 12/54* (2013.01)

(52) U.S. Cl.
USPC ............................ 370/428; 370/222; 370/404

(58) Field of Classification Search
None
See application file for complete search history.

(56) References Cited

U.S. PATENT DOCUMENTS

| 7,436,784 | B2 * | 10/2008 | Hashimoto | ................... 370/258 |
| 2005/0249233 | A1 | 11/2005 | Akaba et al. | |
| 2006/0056425 | A1 * | 3/2006 | Wu et al. | ....................... 370/401 |
| 2006/0087966 | A1 | 4/2006 | Sawada et al. | |

FOREIGN PATENT DOCUMENTS

| JP | 2003-078556 | 3/2003 |
| JP | 2003-249940 | 9/2003 |
| JP | 2006-128764 | 5/2006 |
| WO | 2004/064335 | 7/2004 |

OTHER PUBLICATIONS

European Search Report dated Feb. 18, 2008, from the corresponding European Application.
Notice of Rejection dated Jul. 12, 2011, from corresponding Japanese Application No. 2006-213899.
Notice of Rejection dated Nov. 29, 2011, from corresponding Japanese Application No. 2006-213899.

\* cited by examiner

*Primary Examiner* — Bunjob Jaroenchonwanit
(74) *Attorney, Agent, or Firm* — Katten Muchin Rosenman LLP

(57) ABSTRACT

A network device is connected to another network device over a network and performs multicast transmission and reception over the network. The network device stores in a storage unit in a corresponding manner a drop address that uniquely identifies data to be dropped from the network and control data that indicates whether dropped data is to be forwarded or deleted. The network device drops the data based on the drop address, and then either forwards or deletes the dropped data based on the control data.

3 Claims, 9 Drawing Sheets

FIG.4

| DROP ADDRESS | DELETION BIT ||
| :---: | :---: | :---: |
| | L ROUTE | R ROUTE |
| MC1 | 1 | 1 |
| MC2 | 0 | 1 |
| | | |
| | | |

NETWORK DEVICE AND DATA CONTROL PROGRAM

BACKGROUND OF THE INVENTION

1. Field of the Invention

The present invention relates to a network device and a data control program that perform multicast transmission and multicast reception over a ring or cascade network.

2. Description of the Related Art

Multicast transmission has been used in a ring or cascade network, particularly, in a resilient packet network (RPR) having two way channels. Specifically, when a transmitter node transmits data over the network, receiver nodes, which has already stored therein a specific drop address that uniquely identifies data, receives data that is allocated with the specific drop address over the network. However, in multicast method, the data is transmitted to a large number of unspecified nodes, irrespective of whether the data is required by the nodes, resulting in generation of unnecessary packets and wasteful consumption of network bandwidth.

To explain the conventional technology with reference to FIG. 9, for example, devices A to H are connected over a ring RPR network having two-way transmission channels. Data MC1 is transmitted from the device A through multicast over the network in both directions and is received by the devices C, G, and H. The devices C, G, and H already have stored in them the address of the data MC1 in the form of a drop address, and drop the data MC1 circulating in the network based on the stored drop address. The data MC1 keeps circulating in the network, consuming network bandwidth, until it is deleted. Therefore, various technologies have been disclosed to prevent wasteful consumption of network bandwidth.

For example, Japanese Patent Application Laid-open No. 2003-249940 discloses a technology in which a transmitter node sends a receipt acknowledgement for the transmitted data. A receiver node, upon receiving the receipt acknowledgement, sets an acknowledgement bit concerning data that the receiver node has already received ON, and transmits the receipt acknowledgement to the next node downstream of itself. When the receipt acknowledgement returns to the transmitter node after having circulated the network once, the transmitting node checks whether data circulating in the network has been received by all nodes that are to receive the data based on the acknowledgement bits, and deletes, when it is determined that all the nodes have received the data, the multicast packet on data.

However, the conventional technology still proves inadequate in preventing wasteful consumption of network bandwidth. This is because the data packet is deleted only after circulated the entire network. It means that data is transmitted to even a node on the network that does not need the data.

Specifically, as shown in FIG. 9, the data MC1 is transmitted to all the devices A to H, whereas only the devices C, G, and H require the data MC1 in the conventional multicast method. That is, the data is wastefully transmitted to the devices D, E, and F (represented by dotted line), leading to wasteful consumption of network bandwidth.

SUMMARY OF THE INVENTION

It is an object of the present invention to at least partially solve the problems in the conventional technology.

According to an aspect of the present invention, there is provided a network device that performs multicast transmission and multicast reception over a network that has a plurality of network devices, the network being any one of a ring network and a cascade network, the network device including a storage unit that stores therein in a corresponding manner a drop address that uniquely identifies data circulating in the network and control data that indicates whether the data is to be forwarded in the network; and a control unit that determines whether data circulating in the network is to be dropped based on the drop address, when determining that data circulating in the network is to be dropped, drops determined data, and further determines whether dropped data is to be forwarded based on the control data, when determining that the dropped data is to be forwarded, forwards the dropped data, and when determining that the dropped data is not to be forwarded, deletes the dropped data.

According to another aspect of the present invention, there is provided a method of performing multicast transmission and multicast reception over a network that has a plurality of network devices, the network being any one of a ring network and a cascade network, the method including storing in a storage unit in a corresponding manner a drop address that uniquely identifies data circulating in the network and control data that indicates whether the data is to be forwarded in the network; and controlling that includes a first controlling that includes first determining including determining whether data circulating in the network is to be dropped based on the drop address, and dropping, when data circulating in the network is determined to be dropped at the first determining, determined data, and a second controlling that includes second determining including determining whether dropped data is to be forwarded based on the control data, forwarding, when the dropped data is determined to be forwarded at the second determining, the dropped data, and deleting, when the dropped data is determined not to be forwarded at the second determining, the dropped data.

According to still another aspect of the present invention, there is provided a computer-readable recording medium that stores therein a computer program to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram of the contents stored in a data-control storage unit shown in FIG. 3;

DETAILED DESCRIPTION OF THE PREFERRED EMBODIMENTS

Exemplary embodiments of the present invention are described below with reference to the accompanying drawings.

Figure 1:
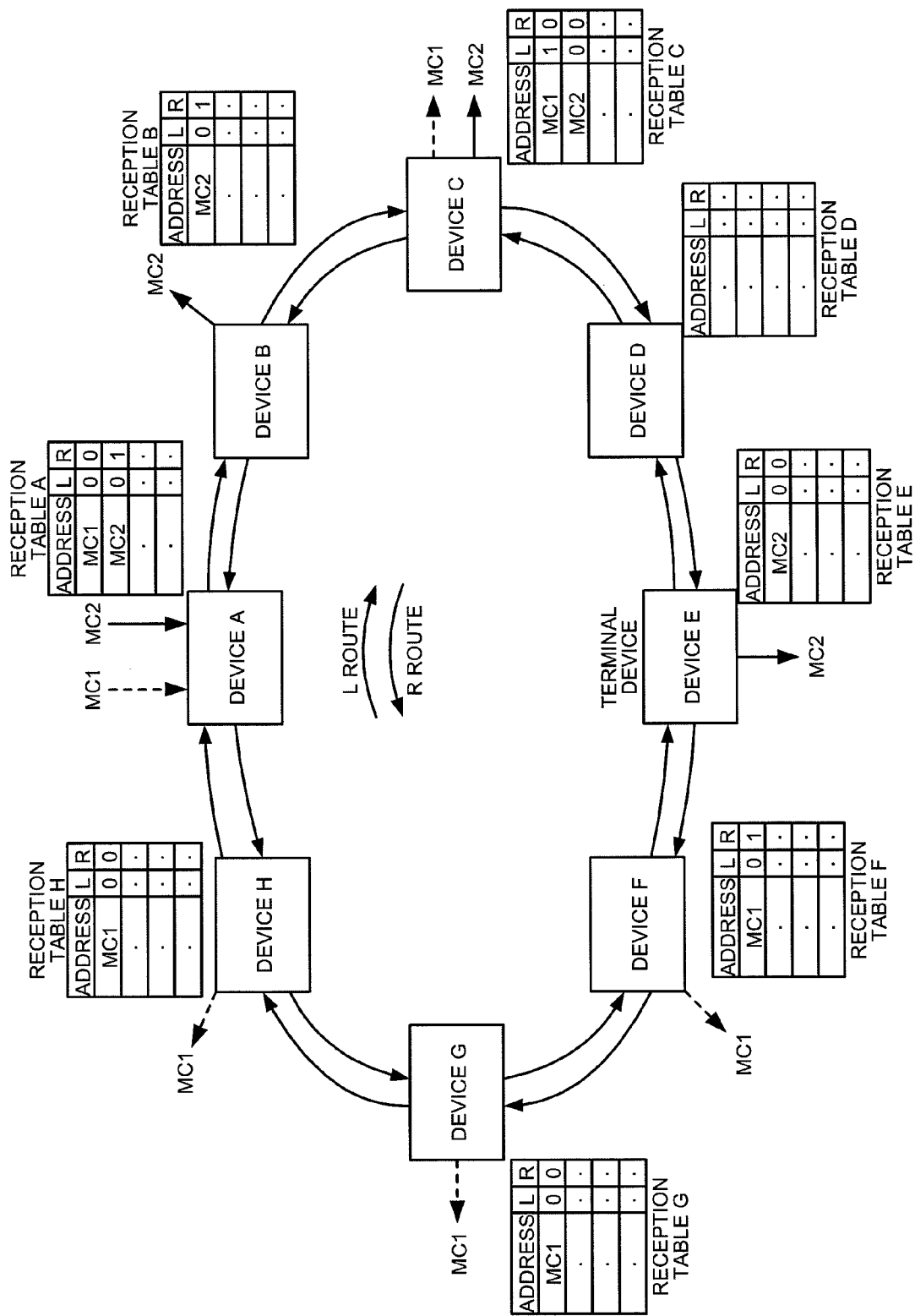
FIG. 1 is a schematic diagram of a system that includes a network device according to a first embodiment of the present invention.
Figure 2:
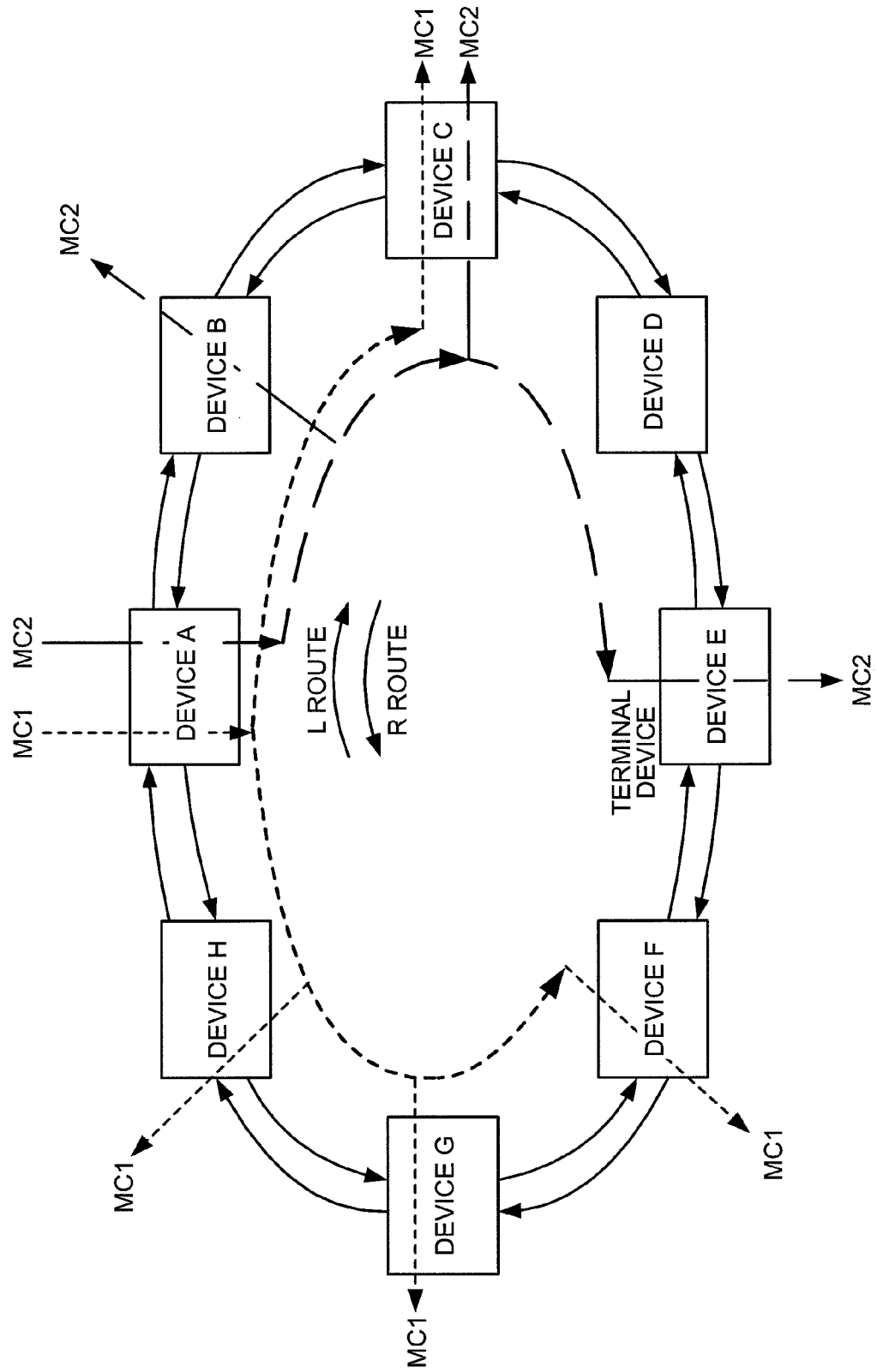
FIG. 2 is a schematic diagram for explaining the salient feature of the network device shown in FIG. 1.

An overview and salient feature of a network device according to a first embodiment of the present embodiment are described below with reference to FIGS. 1 and 2. FIG. 1 is a schematic diagram of a system that includes the network device. FIG. 2 is a schematic diagram for explaining the salient feature of the network device.

As shown in FIG. 1, the system includes devices A to H (for example, routers) as network devices that are inter-connected over an RPR network that is one of ring networks having two way channels (i.e., a left (L) route and a right (R) route). Each of the devices A to H stores therein drop addresses that uniquely identify data to be dropped by multicast transmission/reception function. Further, a device E, which is a terminal device, is configured to receive data from both the L route and the R route. The device E gives priority to the L route when receiving data, and when all the data have reached the terminal device, the data are deleted at the terminal device.

Thus, the system performs multicast transmission/reception, and enables prevention of wasteful consumption of network bandwidth in a ring or cascade network.

Each of the network devices of the system, namely, the devices A to H (routers, for example) stores control data indicating whether received data is to be forwarded or deleted in associated with the drop address that uniquely identifies data to be dropped from the network by the multicast transmission/reception.

Specifically, each of the devices A to H has a reception table and a transmission table each of which stores therein the drop address and the control data. The drop address in the reception table uniquely identifies data to be dropped from the network, and the drop address in the reception table uniquely identifies data to be sent over the network. The control data includes an L-route deletion bit and an R-route deletion bit. If the deletion bit is set to "1", data is deleted, while the deletion bit is set to "0", data is forwarded. The L-route deletion bit forwards the data clockwise, and the R-route deletion bit forwards the data counter-clockwise. If there is no set of the drop address and the control data in the reception table that corresponds to data in the network, the data is forwarded without being dropped. In a case of the device B having the reception table that stores therein "MC2, 0, 1", "MC2" is a drop address, "0" is the L-route deletion bit indicating that data is to be forwarded clockwise, and "1" is the R-route deletion bit indicating that data is to be deleted. The device C stores two sets of data "MC1, 1, 0" and "MC2, 0, 0" in the reception table. The device A, which is a source of data MC1 and MC2, stores two sets of data "MC1, 0, 0" and "MC2, 0, 0" in the transmission table. The other devices also store such data in the reception table as shown in FIG. 1.

The network device drops the data based on the drop address and the control data thereof, and either forwards or deletes the received data.

For example, when transmitting the data MC1 and MC2 over the network, the device A transmits data MC1 and MC2 over both the L route and the R route based on the transmission table stored in the device A. In other words, as the transmission table stored in the device A contains "0" for the L route and "0" the R route for the drop address "MC1", the device A transmits the data MC1 to both the L route and the R route (that is, to both the devices B and H). Similarly, the drop address "MC2" has "0" for the L route and "1" for the R route associated with it in the transmission table. Consequently, the device A transmits the data MC2 only to the L route (that is, the device B) and deletes the data MC2 in the R route (the device H).

The device B which is located in the L route in relation to the device A and to which the device A transmits both the data MC1 and MC2, contains "MC2, 0, 1" in the reception table. Therefore, the device B drops the data MC2 from the network, forwards data MC2 to the L route and deletes data MC2 in the R route. As for the data MC1, the device B forwards data MC1 to the device downstream of itself.

The device H which is located in the R route in relation to the device A and to which the device A transmits the data MC1, contains "MC1, 0, 0" in the reception table. Therefore, the device H drops the data MC1 from the network and forwards data MC1 to both the L route and the R route.

Thus, when the data reaches a particular device, the concerned device drops the data from the network and forwards or deletes the data based on the drop address and the control data the device contains in the reception table. In the example described above, as shown in FIG. 2, the data MC1 reaches the device C and is deleted by the device C in the L route, and reaches the device F and is deleted by the device F in the R route (dashed line). Similarly, the data MC2 reaches the terminal device (i.e., the device E), and is deleted by the device E in the L route, and is deleted by the device A itself in the R route (dashed line).

In the conventional network, both the data MC1 and MC2 are transmitted to all the devices in the L route and the R route. However, once the data is deleted by a device, the data does not flow downstream of the device that deletes the data. For example, the data MC1 does not flow downstream of the device C in the L route and downstream of the device F in the R route. Similarly, the data MC2 does not flow downstream of the device E in the L route and downstream of the device A in the R stream.

Thus, the network device according to the first embodiment by itself performs assessment of whether the data is to be dropped, forwarded, or deleted, and forwards the data to only to other network devices that require the data. Consequently, wasteful consumption of network bandwidth can be prevented in the ring or cascade network. Further, decentralizing the management of the drop address and control data enables the process load to be distributed over the entire route rather than loading a single device.

Figure 3:
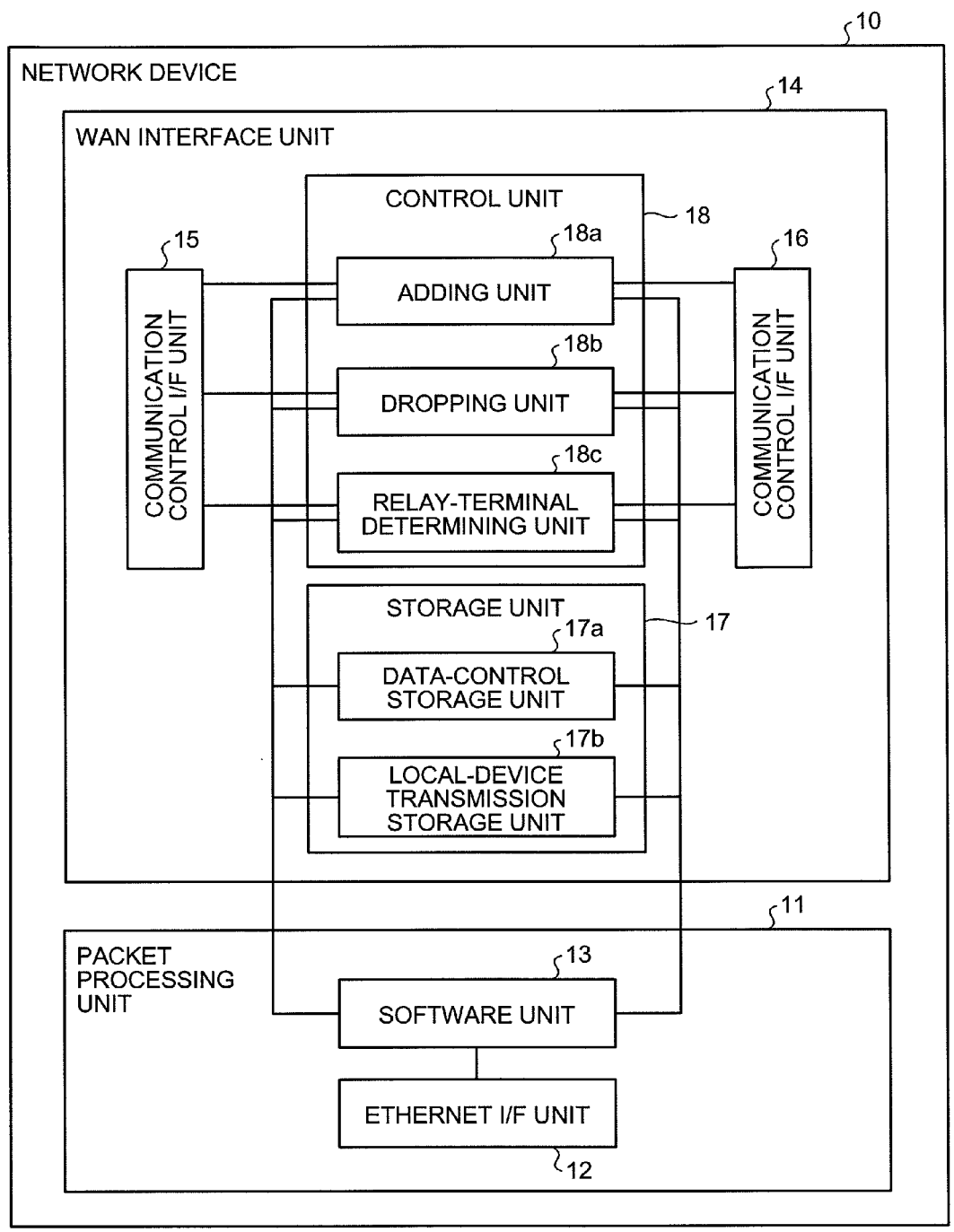
FIG. 3 is a block diagram of the network device shown in FIG. 1.

The configuration of the network device shown in FIGS. 1 and 2 is described below with reference to FIG. 3. FIG. 3 is a block diagram of the network device. As shown in FIG. 3, a network device 10 includes a packet processing unit 11 and a wide area network (WAN) interface unit 14.

The packet processing unit 11 controls communications between the network device 10 and the Ethernet®. In close relevance to the embodiment, the packet processing unit 11 includes an Ethernet interface unit 12 and a software unit 13.

The Ethernet interface unit 12 controls communications between the network device 10 and the Ethernet. Specifically, the Ethernet interface unit 12 controls communications concerning exchange of data between the network devices 10 connected to the Ethernet. The software unit 13 processes the data dropped by the network device 10 from the network. Specifically, the software unit 13 transmits the data dropped by the WAN interface unit 14, described later, to another device connected to the Ethernet, transmits the data received from the Ethernet interface unit 12 to the WAN interface unit 14, etc.

The WAN interface unit 14 controls the communication of the network device 10 at the WAN. In close relevance to the embodiment, the WAN interface unit 14 includes a communication control interface (I/F) unit 15, a communication control I/F unit 16, a storage unit 17, and a control unit 18.

The communication control I/F unit 15 controls communication concerning exchange of data between the network device 10 and a device located downstream in the counter-clockwise direction. Specifically, if the network device 10 is taken as the device A in FIG. 1, the communication control I/F unit 15 controls communication between the device A and the device located downstream of the device A in the counter-clockwise direction (R route), namely, the device H. The communication control I/F unit 16 controls communication concerning exchange of data between the network device 10 and a device located downstream in the clockwise direction. Specifically, if the network device 10 is taken as the device A in FIG. 1, the communication control I/F unit 16 controls communication between the device A and the device located downstream of the device A in the clockwise direction (L route), namely, the device B.

The storage unit 17 stores therein data and computer programs necessary for various processes performed by the control unit 18. In close relevance to the embodiment, the storage unit 17 includes a data-control storage unit 17a and a local-device transmission storage unit 17b.

The data-control storage unit 17a stores therein the drop address that uniquely identifies the data to be dropped from the network by using multicast transmission and reception, in an associated form with the control data that indicates whether the dropped data is to be forwarded or deleted. Specifically, as shown in FIG. 4, the data-control storage unit 17a stores therein data in the form of "MC1, 1, 1", "MC2, 0, 1", where "MC1" and "MC2" indicate the drop address that uniquely identifies the received data, "1" and "0" indicate the L-route control bits, which are the control data for forwarding the data clockwise or for deleting the data, and "1" and "1" are the R-route control bits, which are the control data for forwarding the data counter-clockwise or for deleting the data. The control bit "1" indicates that the dropped data is to be deleted and the control bit "0" indicates that the dropped data is to be forwarded. The data stored in the data-control storage unit 17a can be changed as required, unless specified otherwise.

The local-device transmission storage unit 17b stores therein data that controls multicast transmission of the network device 10. Specifically, the local-device transmission storage unit 17b stores therein data identical in format to the data shown in FIG. 4. For example, the data stored in the local-device transmission storage unit 17b would be in the form of "MC1, 0, 1", where MC1 uniquely identifies the transmission data, "0" is the L-route deletion bit, which is the control data for forwarding the data clockwise or for deleting the data, and "1" is the R-route deletion bit, which is the control data for forwarding the data counter-clockwise or for deleting the data. The data stored in the local-device transmission storage unit 17b can be changed as required, unless specified otherwise.

The control unit 18 has an internal memory for storing therein a control program or computer programs that execute various process procedures and data required for the computer programs, and performs the various processes with the help of the computer programs and data. In close relevance to the present invention, the control unit 18 includes an adding unit 18a, a dropping unit 18b, and a relay-terminal determining unit 18c.

The adding unit 18a transmits data from the network device 10 to the WAN network. Specifically, when transmitting data from the network device 10 to the WAN network through multicast, the adding unit 18a refers to the local-device transmission storage unit 17b, and transmits the data to the device that is located downstream of the network device 10 via the communication control I/F unit 15 or 16. Specifically, if the local-device transmission storage unit 17b contains the data "MC 1, 0, 1", the adding unit 18a transmits the data to which the drop address MC1 is assigned to the L route, and deletes the data without transmitting it to the R route.

The dropping unit 18b drops the data based on the drop address and the control data stored in the data-control storage unit 17a, and either forwards or deletes the dropped data. Specifically, if the data-control storage unit 17a contains the data "MC1, 1, 1" and "MC2, 0, 1", the dropping unit 18b deletes the data to which the drop address MC1 is assigned without transmitting it to either the L route or the R route, and transmits the data to which the drop address MC 2 is assigned to the L route but deletes the data without transmitting it to the R route.

The relay-terminal determining unit 18c determines whether the network device 10 is a terminal device. Specifically, the relay-terminal determining unit 18c determines whether the network device 10 is a relay device or a terminal device by transmitting and receiving channel data stored in itself at regular intervals. If it is determined that the network device 10 is a terminal device, the relay-terminal determining unit 18c deletes the data when all the data reaches the network device 10 that functions as the terminal device.

Figure 5:
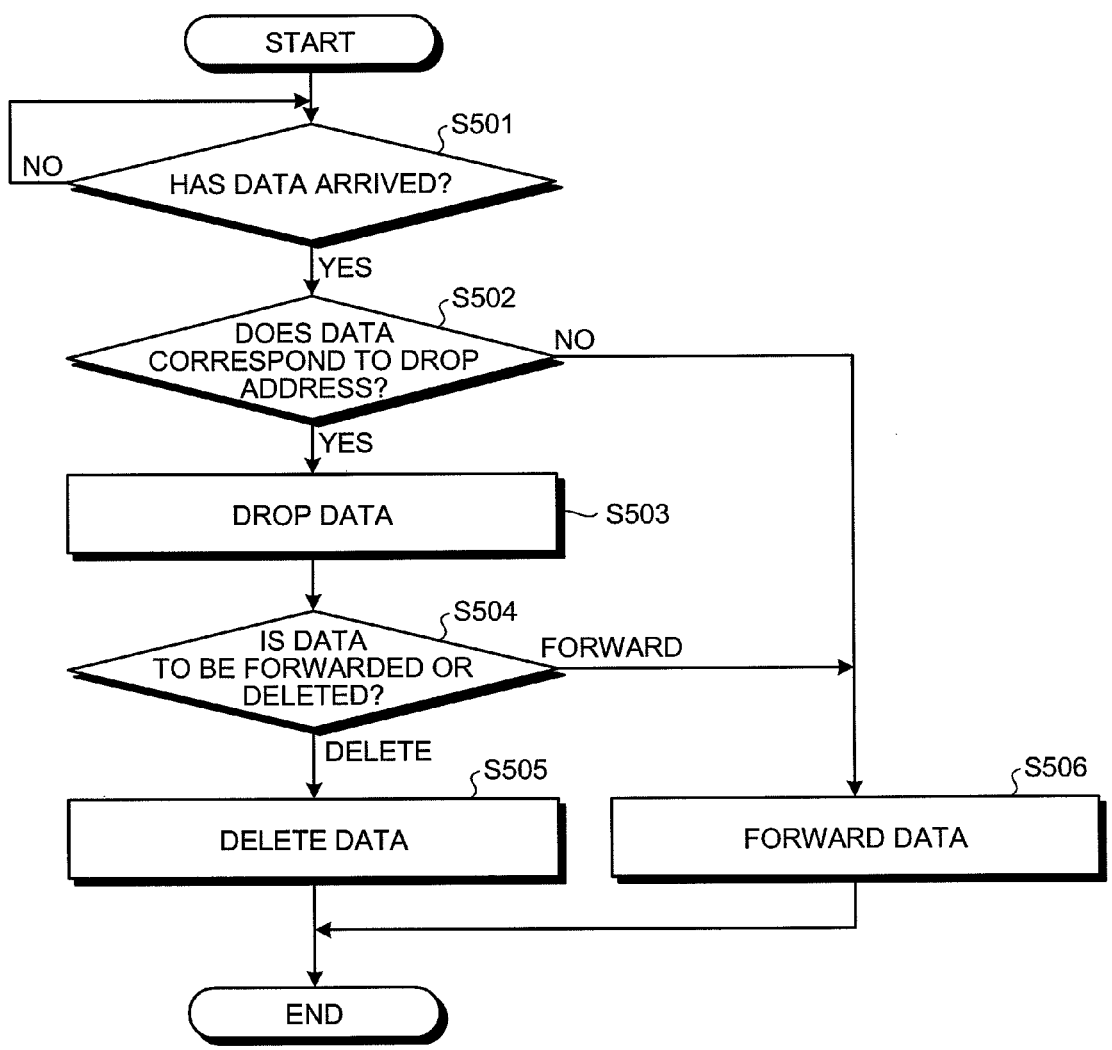
FIG. 5 is a flowchart of a process performed by the network device shown in FIG. 1.

The process performed by the network device 10 is described below with reference to FIG. 5. FIG. 5 is a flowchart of the process performed by the network device 10.

When data arrives at the network device 10 (Yes at step S501), the dropping unit 18b of the network device 10 checks whether the data corresponds to the drop address stored in the data-control storage unit 17a (step S502).

If the network device 10 determines that the data corresponds to the drop address (Yes at step S502), the dropping unit 18b drops the data (step S503).

Specifically, if the data-control storage unit 17a contains the data "MC2, 0, 1", when data having the address MC2 reaches the network device 10, the dropping unit 18b drops the data.

The dropping unit 18b then either forwards or deletes the dropped data based on the drop address and the control data stored in the data-control storage unit 17a (step S504).

If it is determined that the dropped data is to be deleted, that is, if "1" is stored associated with the drop address for both the L route and the R route in the data-control storage unit 17a, the dropping unit 18b deletes the dropped data (step S505).

If it is determined that the dropped data is to be forwarded, that is, if "0" is stored associated with the drop address for either the L route or the R route in the data-control storage unit 17a, the dropping unit 18b forwards the dropped data in the specified direction (step S506).

More specifically, in a case of "MC2, 0, 1", the dropping unit 18b forwards the dropped data to the L route, and deletes the dropped data in the R route, that is, not forwarding the dropped data to the R route.

If the data that reaches the network device 10 does not correspond to the drop address stored in the data-control storage unit 17a (No at step S502), the dropping unit 18b forwards the data (step S506).

Thus, according to the first embodiment, the network device stores the drop address that uniquely identifies the data to be dropped from the network by using multicast transmission and reception, in an associated form with the control data that indicates whether the dropped data is to be forwarded or deleted. The network device drops the data from the network based on the drop address and the control data, and either forwards or deletes the dropped data. Consequently, the network device (for example, a router) itself determines whether the data is to be dropped, forwarded, or deleted, and forwards the data only to another network device that require the data. As a result, wasteful consumption of the network bandwidth of a ring or cascade network can be prevented. Furthermore, decentralizing the management of the drop address and control data enables the process load to be distributed over the entire system rather than loading a single device.

In the first embodiment, a control policy, that is, which dropped data is to be forwarded or deleted is stored in advance in the data-control storage unit 17a. However, the network device can be configured to automatically update the control policy.

In a second embodiment of the present invention, the control policy stored in the data-control storage unit 17a is updated dynamically and automatically.

Figure 6:
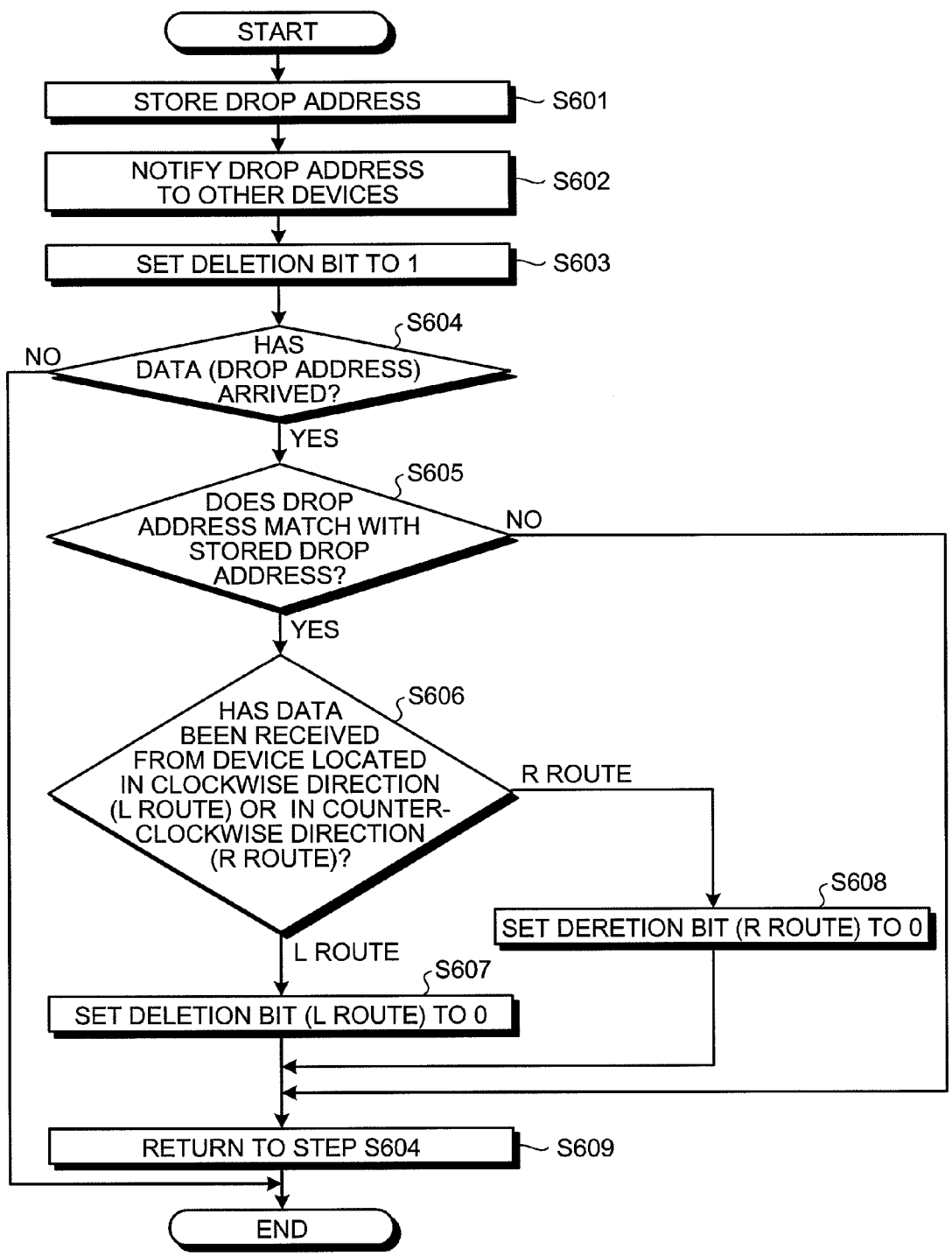
FIG. 6 is a flowchart of a process performed by the network device according to a second embodiment of the present invention.

FIG. 6 is a flowchart of the process performed by the network device according to the second embodiment. The network device 10 stores the drop address of the data to be dropped in the data-control storage unit 17a (step S601), and notifies the drop address to another network device to which the network device 10 is connected (step S602).

To explain with reference to FIG. 1, the device G stores the drop address MC1 of the data to be dropped in the data-control storage unit 17a, and notifies the drop address MC1 to the devices H and F, both of which on the network.

The network device 10 then updates, associated with the drop address, the control data indicating that the dropped data is to be deleted (step S603). In other words, the network device 10 sets the control bit to "1" for both the L route and the R route. When the network device 10 receives the drop address stored in a transmission device located downstream of itself in the direction of the data flow (Yes at step S604), the network device 10 checks whether the received drop address and the drop address that the network device 10 has stored in itself match (step S605).

When the network device 10 does not receive the drop address stored in a transmission device located downstream of itself in the direction of the data flow (No at step S604), the process control goes to end.

Specifically, the device G stores in the data-control storage unit 17a "MC1" associated with "1" for the L route and "1" for the R route. If the device G receives the drop address from the device H and also from the device F device, which are located downstream of the device G in the direction of the data flow, the device G checks whether the drop addresses received from the devices H and F match with the drop address the network device 10 has stored in itself. For example, if the device G receives the drop address MC1 from the device H, and also receives the drop address MC1 from the device F, the device G determines that the received drop addresses match with the drop address the network device 10 has stored in itself. If the device G receives any drop address other than MC1, the device G determine that the received drop address does not match with the drop address the network device 10 has stored in itself.

If the received drop address and the drop address stored in the network device 10 match (Yes at step S605), the network device 10 determines whether the received drop address is from the network device located in the clockwise direction in relation to itself or from the network device located in the counter-clockwise direction in relation to itself (step S606).

Specifically, if the drop address received from the device H matches with the drop address MC1 stored in the device G, the device G determines whether the device H is located in the clockwise direction or in the counter-clockwise direction in relation to itself. For example, upon receiving the drop address MC1 from the device H, the device G determine, based on routing control data, etc., that the received drop address is from the device located in the clockwise direction in relation to itself. Upon receiving the drop address MC1 from the device H, the device G determines, based on the routing control data, etc., that the received drop address is from the device located in the counter-clockwise direction in relation to itself.

If the network device 10 determines that the received drop address is from the device located in the clockwise direction in relation to itself, the network device 10 sets "0" as the L-route deletion bit associated with the drop address that has already stored in itself (step S607) to cause the data to be forwarded. Thereafter, the process control returns to step S604 (step S609).

Specifically, as the device H is located in the clockwise direction in relation to the device G, the device G sets "0" as the L-system deletion bit associated with the drop address MC1 that has already stored in the device G to cause the dropped data to be forwarded.

If the network device 10 determines that the received drop address is from the device located in the counter-clockwise direction in relation to itself, the network device 10 sets "0" as the R-route deletion bit associated with the drop address that has already stored in itself (step S608) to cause the data to be forwarded. Thereafter, the process control returns to step S604 (step S609).

Specifically, as the device F is located in the counter-clockwise direction in relation to the device G, the device G stores "0" as the R-route deletion bit associated with the drop address MC1 the device G already has stored in itself to indicate that the dropped data is to be forwarded.

If the network device 10 determines that the received drop address does not match with the drop address stored in itself (No at step S605), the process control returns to step S604 (step S609).

Thus, according to the second embodiment, the network device receives the drop address from the device that is downstream of itself in the direction of the data flow. The network device then determines whether the received drop address matches with the drop address the network device has stored in itself. Depending on the determination whether the received drop address matches with the drop address the network device has stored in itself, the network device automatically updates a control policy (data that indicates whether the data to which the drop address is assigned is to be forwarded to the next device or deleted) and stores therein the control policy associated with the drop address. Consequently, the possibility of human error while manually entering the control policy for multicast data is eliminated, accounting for a more accurate establishment of a multicast control method.

The embodiments described above allow various modifications. The modifications to the described embodiments are collectively described below as a third embodiment of the present invention.

(1) Network Device

In the first and the second embodiments, a router was taken as an example of the network device. However, any network device that can be deployed in an Internet Protocol (IP) network can be used. For example, a layer-3-switch, a firewall that includes a router functionality, etc., can be used as the network device.

(2) Cascade Topology

The first and the second embodiments are explained by taking a ring network. The embodiments are applicable to a cascade network.

Figure 7:
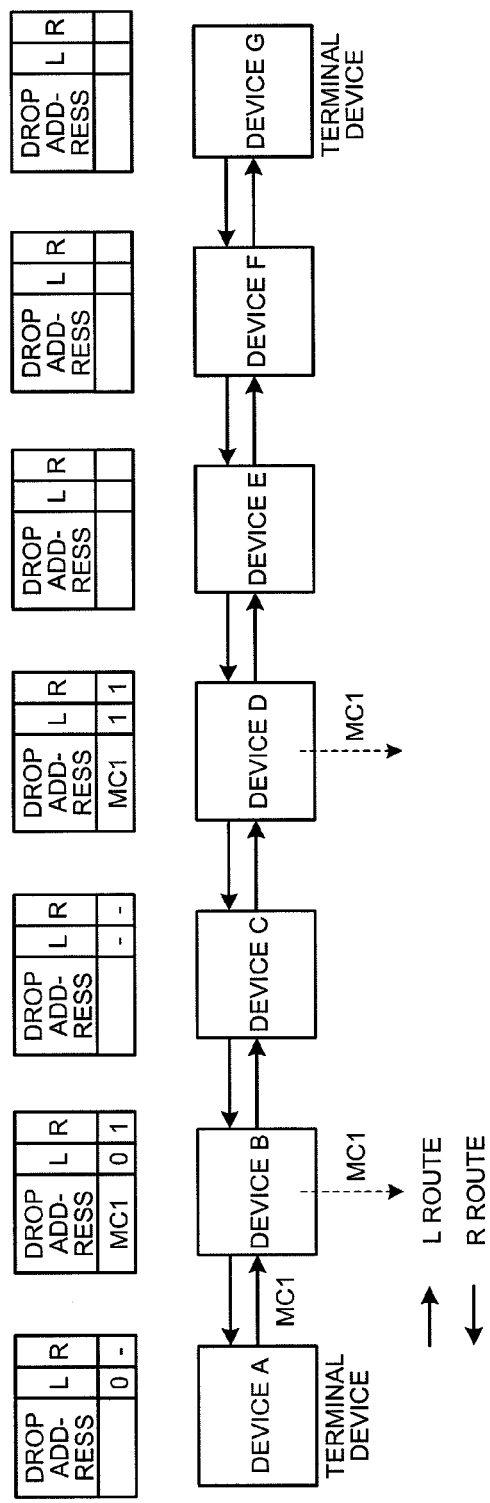
FIG. 7 is a schematic diagram of a system that includes the network device according to the second embodiment.

For example, as shown in FIG. 7, the devices A to H are connected over a cascade network. The device A transmits the data "MC1", and the devices B and D receive (drop) the data from the device A. The devices on the cascade network are connected in clockwise direction (L route) and counter-clockwise direction (R route) like in the ring network. However, there are two terminal devices, namely the devices A and G, in the cascade network. For example, the data-control storage unit 17a stores therein "MC1, 0, 1" where "MC1" is the drop address, "0" is the L-route deletion bit, and "1" is the R-route deletion bit. Specifically, the data MC1, transmitted from the device A, flows up to the device D having the deletion bit of "1" as shown in FIG. 7. When the transmitted data reaches a network device having the deletion bit of "–", the data is neither forwarded nor deleted.

Thus, even if the network devices are connected over the cascade network, the network device determines whether the data is to be dropped, forwarded, or deleted, and transmits the data only to a network device that require the data. Consequently, wasteful consumption of network bandwidth can be prevented.

(3) System Configuration, etc.

The constituent elements of the network device shown in FIG. 2 are merely conceptual and may not necessarily physically resemble the structures shown in the drawings. For instance, the apparatus need not necessarily have the structure that is illustrated (for example, the adding unit and the dropping unit can be integrated as a single unit). The apparatus as a whole or in parts can be broken down or integrated either functionally or physically in accordance with the load or how the apparatus is to be used. The process functions performed by the apparatus can be entirely or partially realized by the central processing unit (CPU) or a computer program executed by the CPU or by a hardware using wired logic.

(4) Computer Programs

The processes described in the first and the second embodiments can be realized by executing a pre-installed program by a computer system such as a personal computer or a workstation. A computer system that executes a computer program to realize the same functions as the network device according to the first and the second embodiments is described below.

Figure 8:
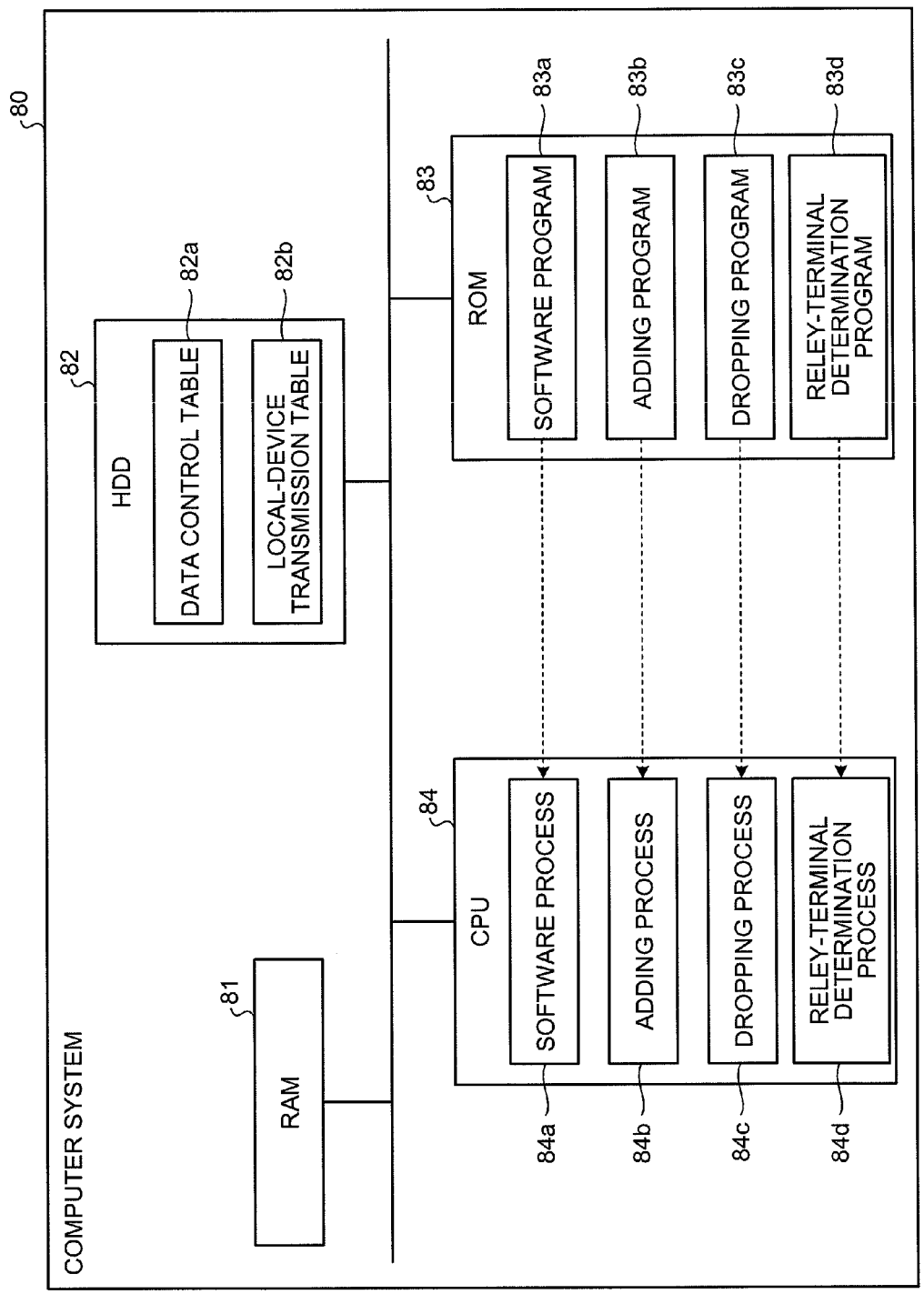
FIG. 8 is a block diagram of a computer system that executes a data control program.
Figure 9:
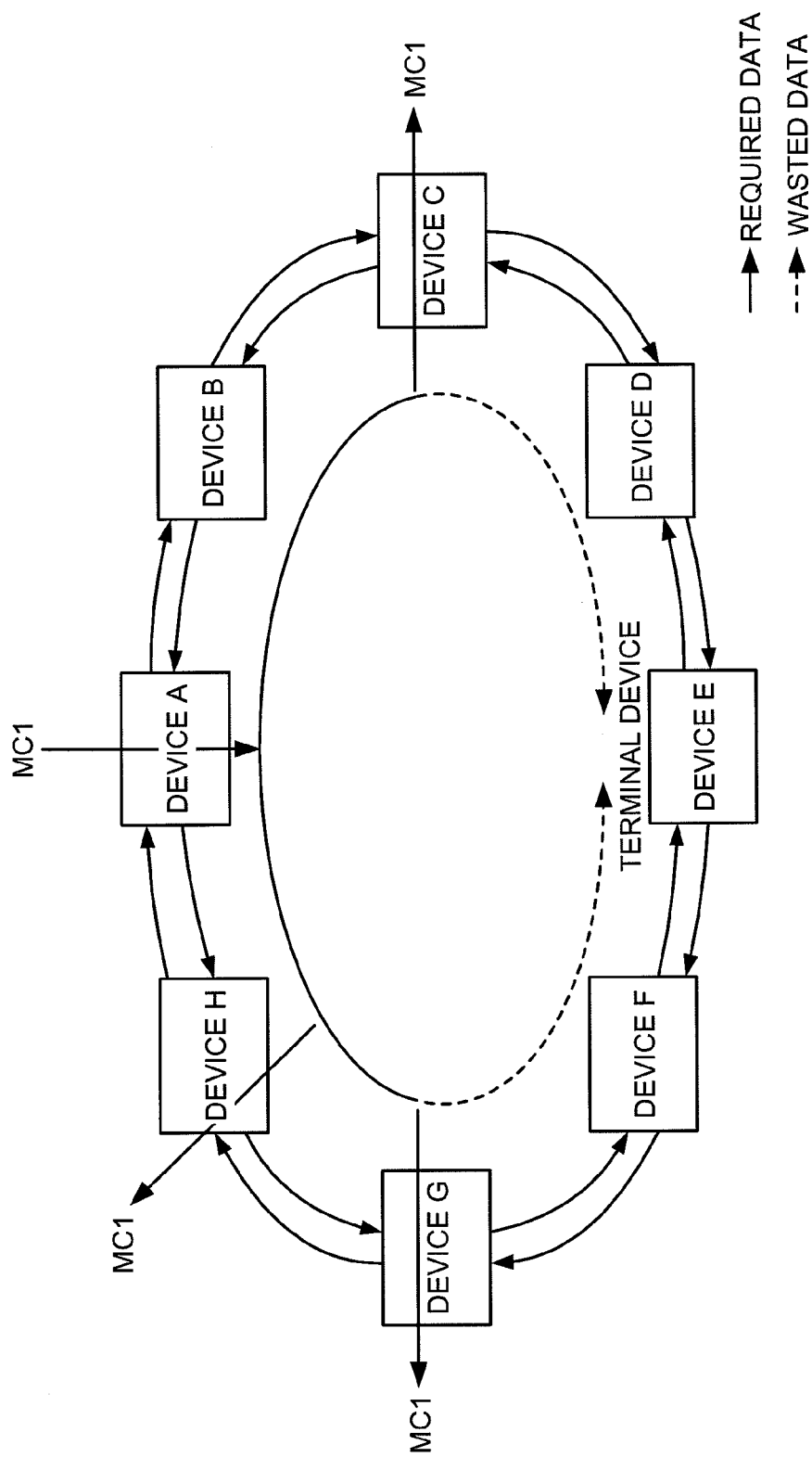
FIG. 9 is a schematic diagram for explaining the conventional technology.

FIG. 8 is a block diagram of a computer system 80 that executes a data control program. The computer system 80 includes a random access memory (RAM) 81, a hard disk drive (HDD) 82, a read-only memory (ROM) 83, and a CPU 84. The ROM 83 has pre-installed therein programs, namely, a software program 83a, an adding program 83b, a dropping program 83c, and an relay-terminal determination program 83d, that demonstrate the functionalities of the network device according to the first and the second embodiments.

The CPU 84 reads and executes the computer programs 83a to 83c to perform a software process 84a, an adding process 84b, a dropping process 84c, and a relay-terminal determination process 84d, respectively. The software process 84a, the adding process 84b, the dropping process 84c, and the relay-terminal determination process 84d correspond to the software unit 13, the adding unit 18a, the dropping unit 18b, and the relay-terminal determining unit 18c shown in FIG. 2, respectively.

The HDD 82 stores therein a data control table 82a and a local-device transmission table 82b. The data control table 82a contains the drop address that uniquely identifies the data circulating in the network through multicast transmission and reception and that is to be dropped from the network, in an associated form with the control data that indicates whether the dropped data is to be forwarded or deleted. The local-device transmission table 82b contains control data that controls the transmission of data by the local network device 10 through multicast. The data control table 82a and the local-device transmission table 82b correspond, respectively, to the data-control storage unit 17a and the local-device transmission storage unit 17b shown in FIG. 2.

The computer programs 83a to 83d need not necessarily be pre-installed in the ROM 83 but can be installed by the computer system 80 from a portable physical medium such as a flexible disk (FD), compact disk-read-only memory (CD-ROM), digital versatile disk (DVD), magneto optic (MO) disk, integrated circuit (IC) card, that can be inserted into the host computer. Alternatively, the program can be stored in and installed from a non-portable physical medium such as the HDD 82 provided in the computer system 80 internally or an external HDD, or another computer system connected to the computer system 80 over a public circuit, Internet, local area network (LAN), or wide area network (WAN).

According to an embodiment of the present invention, the network device (for example, a router) itself determines whether the data is to be dropped, forwarded, or deleted, and forwards the data only to another network device that require the data. As a result, wasteful consumption of the network bandwidth of a ring-type or cascade-type network can be prevented. Furthermore, decentralizing the management of the drop address and control data enables the process load to be distributed over the entire system rather than loading a single device.

Moreover, the network device automatically updates a control policy (which dropped data is to be forwarded or deleted) and stores the control policy associated with the drop address. Consequently, the possibility of human error while manually entering the control policy for multicast data is eliminated, accounting for a more accurate establishment of a multicast control method.

Furthermore, when one of the network devices on the network becomes out of order, data control method can be established by receiving a drop address of a network device that is located downstream. As a result, costs for re-establishing the network can be reduced and the possibility of human error while manually entering the control policy for multicast data is eliminated, accounting for a more accurate establishment of a multicast control method.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A network device that performs multicast transmission and multicast reception over a first network that has a plurality of network devices, the first network being any one of a ring network and a cascade network, the first network having a first route and a second route, the network device comprising:

a storage unit that stores therein in a corresponding manner
a drop address that uniquely identifies data transferred in the first network, one bit of a first control data that indicates whether the data is to be forwarded in the first route and one bit of a second control data that indicates whether the data is to be forwarded in the second route, the drop address specifying data to be dropped from the first network to be transferred to a second network that is different from the first network;

an address reception unit that receives a registered drop address of a lower network device from the lower network device, the lower network device being a network device that is located downstream of the network device in the first network with respect to data flow direction;

an address determining unit that determines whether the registered drop address received by the address reception unit matches with the drop address stored in the storage unit;

a set unit that sets one bit of control data indicating that dropped data is to be forwarded when the address determining unit determines the registered drop address matches with the drop address stored in the storage unit, and one bit of control data indicating that dropped data is to be deleted when the address determining unit determines the registered drop address does not match with the drop address stored in the storage unit, the one bit of control data being set, corresponding to the registered drop address, in control data of a route corresponding to the data flow direction out of the first control data or the second control data; and a control unit that
receives data from the first network,
determines whether received data is to be dropped to be transferred to the second network based on the drop address stored in the storage unit,
when determining that the received data is to be dropped, drops the received data,
further determines whether dropped data is to be forwarded to the first route based on the one bit of the first control data stored in the storage unit,
when determining that the dropped data is to be forwarded to the first route, forwards the dropped data to the first route, and
when determining that the dropped data is not to be forwarded, deletes the dropped data, and
determines whether dropped data is to be forwarded to the second route based on the one bit of the second control data stored in the storage unit,
when determining that the dropped data is to be forwarded to the second route, forwards the dropped data to the second route, and
when determining that the dropped data is not to be forwarded.

2. A computer-readable recording medium that stores therein a computer program to implement a method of performing multicast transmission and multicast reception over a first network that has a plurality of network devices, the first network being any one of a ring network and a cascade network, the first network having a first route and a second route, the computer program causing the computer to execute:

receiving a registered drop address of a lower network device from the lower network device, a drop address identifying uniquely data transferred in the first network and specifying data to be dropped from the first network to be transferred to a second network that is different from the first network, the lower network device being a network device that is located downstream of the network device in the first network with respect to data flow direction;

first determining whether the registered drop address received at the receiving matches with a drop address stored in a storage unit storing in a corresponding manner the drop address, one bit of a first control data that indicates whether the data is to be forwarded in the first route and one bit of a second control data that indicates whether the data is to be forwarded in the second route;

setting one bit of control data indicating that dropped data is to be forwarded when the first determining determines the registered drop address matches with the drop address stored in the storage unit, and one bit of control data indicating that dropped data is to be deleted when the first determining determines the registered drop address does not match with the drop address stored in the storage unit, the one bit of control data being set, corresponding to the registered drop address, in control data of a route corresponding to the data flow direction out of the first control data or the second control data; and controlling that includes
a first controlling that includes
receiving data from the first network,
second determining including determining whether received data is to be dropped to be transferred to the second network based on the drop address stored in the storage unit, and
dropping, when the received data is determined to be dropped at the second determining, the received data, and
a second controlling that includes
third determining including determining whether dropped data is to be forwarded to the first route based on the one bit of the first control data stored in the storage unit,
forwarding, when the dropped data is determined to be forwarded at the third determining, the dropped data to the first route, and
deleting, when the dropped data is determined not to be forwarded at the third determining, the dropped data, and
fourth determining including determining whether dropped data is to be forwarded to the second route based on the one bit of the second control data stored in the storage unit,
forwarding, when the dropped data is determined to be forwarded at the fourth determining, the dropped data to the second route, and
deleting, when the dropped data is determined not to be forwarded at the fourth determining, the dropped data.

3. A method of performing multicast transmission and multicast reception over a first network that has a plurality of network devices, the first network being any one of a ring network and a cascade network, the first network having a first route and a second route, the method comprising:

receiving a registered drop address of a lower network device from the lower network device, a drop address identifying uniquely data transferred in the first network and specifying data to be dropped from the first network to be transferred to a second network that is different from the first network, the lower network device being a network device that is located downstream of the network device in the first network with respect to data flow direction;

first determining whether the registered drop address received at the receiving matches with a drop address stored in a storage unit storing in a corresponding manner the drop address, one bit of a first control data that indicates whether the data is to be forwarded in the first route and one bit of a second control data that indicates whether the data is to be forwarded in the second route;

setting one bit of control data indicating that dropped data is to be forwarded when the first determining determines the registered drop address matches with the drop address stored in the storage unit, and one bit of control data indicating that dropped data is to be deleted when the first determining determines the registered drop address does not match with the drop address stored in the storage unit, the one bit of control data being set, corresponding to the registered drop address, in control data of a route corresponding to the data flow direction out of the first control data or the second control data; and controlling that includes a first controlling that includes receiving data from the first network, second determining including determining whether received data is to be dropped to be transferred to the second network based on the drop address stored in the storage unit, and dropping, when the received data is determined to be dropped at the second determining, the received data, and a second controlling that includes third determining including determining whether dropped data is to be forwarded to the first route based on the one bit of the first control data stored in the storage unit, forwarding, when the dropped data is determined to be forwarded at the third determining, the dropped data to the first route, and deleting, when the dropped data is determined not to be forwarded at the third determining, the dropped data, and fourth determining including determining whether dropped data is to be forwarded to the second route based on the one bit of the second control data stored in the storage unit, forwarding, when the dropped data is determined to be forwarded at the fourth determining, the dropped data to the second route, and deleting, when the dropped data is determined not to be forwarded at the fourth determining, the dropped data.

\* \* \* \* \*